United States Patent [19]

Cho

[11] Patent Number: 5,283,654
[45] Date of Patent: Feb. 1, 1994

[54] TV-RADIO CONVERTER USING A SAME POWER SUPPLY

[75] Inventor: Byung-Seong Cho, Suwon, Rep. of Korea

[73] Assignee: SamSung Electronics Co. Ltd., Suwon, Rep. of Korea

[21] Appl. No.: 680,008

[22] Filed: Apr. 2, 1991

Related U.S. Application Data

[63] Continuation of Ser. No. 378,772, Jul. 12, 1989, abandoned.

[51] Int. Cl.$^5$ .......................... H04N 5/60; H04N 5/63
[52] U.S. Cl. ..................................... 348/730; 315/411; 348/729
[58] Field of Search ...................... 358/190, 194.1, 243, 358/189; 315/408, 411

[56] References Cited

U.S. PATENT DOCUMENTS

| | | | |
|---|---|---|---|
| 4,600,948 | 7/1986 | Dangschat | 358/190 |
| 4,707,775 | 11/1987 | Panse | 358/190 |
| 4,788,618 | 11/1988 | Kimura | 315/411 |
| 4,829,216 | 5/1989 | Rodriguez-Cavazos | 358/190 |
| 4,829,414 | 5/1989 | Yook | 315/408 |
| 4,864,406 | 9/1989 | Hartmann | 358/194.1 |

Primary Examiner—Tommy P. Chin
Attorney, Agent, or Firm—Robert E. Bushnell

[57] ABSTRACT

A TV/radio converter using the common power supply having remocon circuit including main power taking-out device in which applied AC power make main power be applied to the next stage through switching-mode power components and dc-converting components, the device includes; a constant voltage device coupled in the output stage of the switching-mode power components and dc-converting components, wherein the output of the switching mode power components drives the microcomputer (MICOM) and can apply the constant voltage to the next stage, a main power control device, wherein the output of the MICOM controls the input power of horizontal driver components through active components in company with the output of the constant voltage device, thereby controlling the driving power of the TV and radio, and a driving device of a radio, wherein the radio operation can be carried out by driving the switching components using the output of the main power control device and the static voltage device after the active components are driven by the output of the main power control stage. Grading the product up to high-qualified level may be attained.

23 Claims, 1 Drawing Sheet

TV-RADIO CONVERTER USING A SAME POWER SUPPLY

This is a continuation of application Ser. No. 07/378,772 filed on Jul. 12, 1989.

BACKGROUND OF THE INVENTION

The present invention relates to a TV/radio converter using a common power supply, particularly to a converter which can convert and drive a TV and a Radio by driving a MICOM through a stand-by power supply for a drive stage of a remote controller (remocon).

In the past separated power supplies have been used for driving a TV and a radio, but caused a problem because, the composition of circuit was complicated and the cost of a product is raised; also the user requires a high-grade product.

SUMMARY OF THE INVENTION

The present invention has been made in consideration of this and has for its object to provide a TV/radio converter using the same power supply which converts and drives the TV and radio by using the stand-by power supply for a driver of a remote controller thereby simplifying the composition of the circuit and producing a high-grade product.

According to the present invention, there is provided a TV/Radio converter using the same power supply having a remocon circuit including a main power device in which applied AC power enables main power to be applied to the next stage through switching-mode power components and dc-converting components, the device including; a constant voltage taking-out device coupled in the output stage of the switching-mode power components and dc-converting components, wherein the output of the switching-mode power components drives a microcomputer (MICOM) and can apply the constant voltage to the next stage, a main power control device, wherein the output of the MICOM controls the input power of horizontal driver components through the active components in company with the output of the constant voltage device, thereby controlling driving power of the TV and radio, and a driving device of a radio, wherein the radio operation can be carried out by driving the switching components using the outputs of the main power control device and the static voltage taking-out device after the active components are driven by the output of the main power control device.

DETAILED DESCRIPTION OF THE INVENTION

Figure 1:
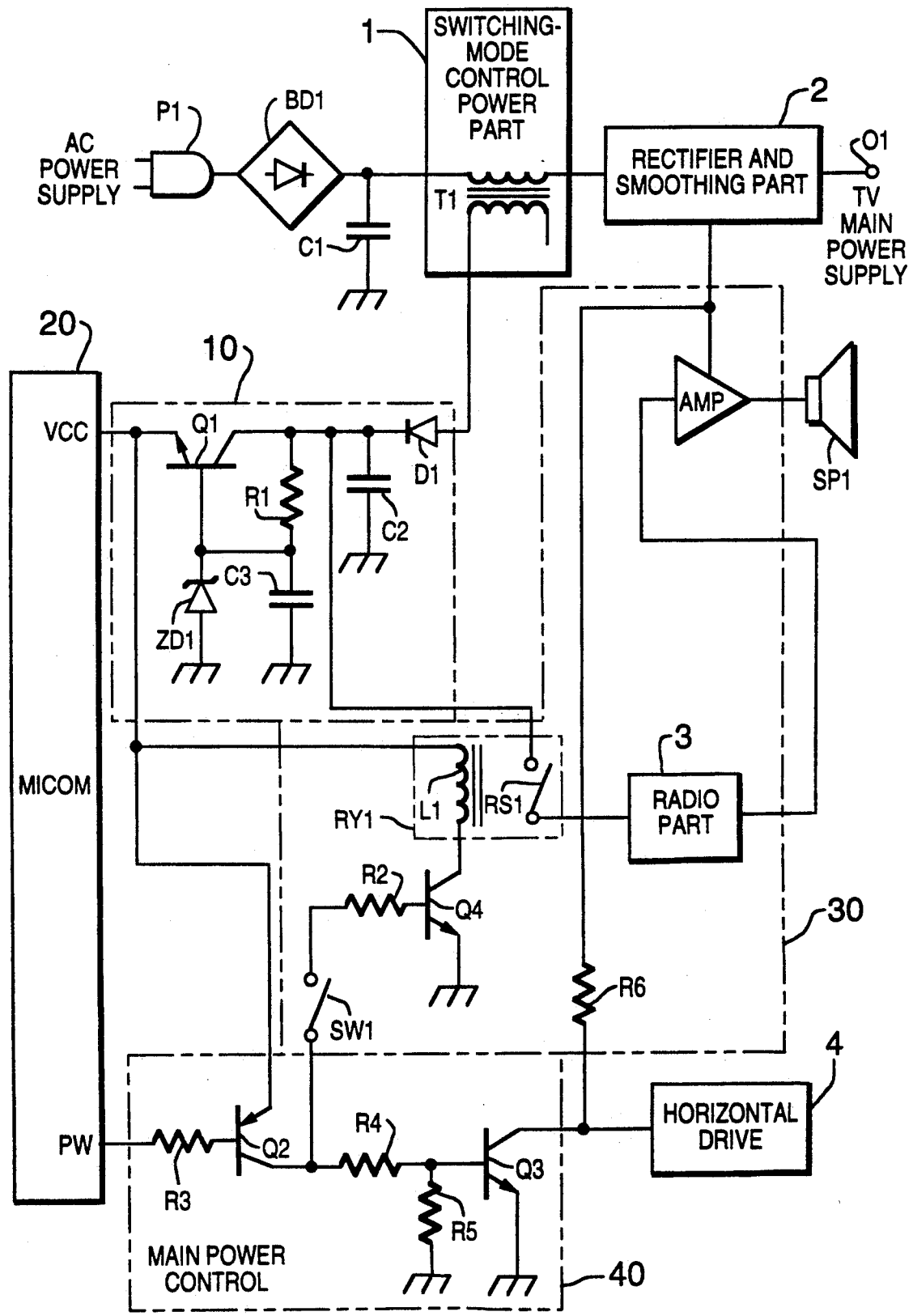
FIG. 1 is a circuit diagram of the present invention

The present invention will be now described in more detail with reference to the accompanying drawing.

As shown in a circuit of the present invention, in the remote controller circuit where applied ac power to plug P1 is converted to dc power through a bridge diode BD1 and a smoothing capacitor C1 and drives the switching-mode control power part 1 so that main power is transmitted to an output terminal O1 through a rectifying and smoothing part 2, the constant voltage part 10 coupled between a transformer T1 and a MICOM 20 can apply a supply voltage Vcc to the MICOM 20 by driving a transistor Q1 through a rectifying diode D1, smoothing capacitors C2 and C3, a bias resistor R1, and a zener diode ZD1 with the secondary voltage of the transformer T1. Main power control part 40 is composed as follows, where the output PW of the MICOM controls the output of the rectifying and smoothing part 2 applied to the horizontal driver 4 through transistor Q2 and Q3 connected with resistors R3–R5 so that the applied voltage to the TV and radio can be controlled. A radio driver 30 is composed as follows, where the output of the main power control device 40 applied to a transistor Q2 drives a transistor Q4 through a switch SW1, and a bias resistor R2, and also drives a relay RY1 composed of an amplifier relay coil L1 and a relay switch SR1 so that the radio operation through a radio part, a AMP, and speaker SP1 can be carried out. Also, R6 is a output resistor of the rectifying and smoothing part 2.

To explain the operation of the present invention in more detail, the applied ac power is converted dc power through the bridge diode BD1 and the smoothing condensor C1 and provides a main supply voltage to an output terminal through the switching-mode control power part 1 and the rectifying and smoothing part 2.

At this time, a induced voltage at the secondary coil of the transformer T1 turns the transistor Q1 on through the rectifying diode D1, smoothing condensor C2 and C3, and the zener diode ZD1, thereby providing the supply voltage Vcc to the MICOM and the output terminal.

For driving the TV, the output PW of the MICOM 20 goes to HIGH level, and the transistors Q2 and Q3 turn off since the current can not flow to the base of the transistor Q2, that is, no bias, thus the output of the rectifying and smoothing part 2 drives the horizontal driver 4 through a resistor R6, so that the TV operation can be carried out; at this time, the transistor Q4 also turns off since the transistor Q2 turns off, thus the relay switch RS1 is opened, making a radio operation shut down.

When the output of the MICOM is low level, a transistor Q2 turns on, and the transistors Q3, Q4 also turn on, and the output of the rectifying and smoothing part 2 is transmitted to the ground through the resistor R6 and a transistor Q3 so that the supply voltage applied to the horizontal driver 4 is intercepted, so that the TV operation is stopped, also at the same time the collector output of the transistor Q2 drives the transistor Q4 through the switch SW1 and the resistor R2 so the transistor Q4 turns on.

Thus the relay coil L1 is driven, making the relay switch SR1 closed so that the radio part 3 is driven and a voice signal is provided through an amplifier AMP and the speaker SP1.

Thus, the radio operation is carried out only before the main power control part 40 can be driven, but if the main power control part is driven, the TV operation can be carried out.

As mentioned above, the TV/radio operation can be driven by controlling the horizontal driver through the MICOM after taking out the other supply voltage from the switching-mode control power part in which the main supply voltage can be taken out, thus a TV/radio converter using the same power supply can be provided and a product becomes high-grade.

The invention is in no way limited to the embodiment described hereinabove. Various modifications of the disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A TV/radio selector of a remote controller type using a common power supply including a main power circuit enabling electrical power to be applied to other stages through switching-mode power components and rectifying components, the selector comprising:

a constant voltage stage coupled to an output terminal of the switching-mode power components and rectifying components, wherein a voltage generated by said constant voltage stage is provided to drive a microcomputer and said constant voltage stage can provide a voltage to another stage;

main power control means, for enabling the microcomputer to control application of said electrical power to horizontal driver components of a television through active components by controlling application of the output of said voltage to the main power control means, thereby controlling distribution of said electrical power to the television and a radio; and means for driving the radio, wherein said electrical power can be applied to the radio using an output of said main power control means and said voltage from said constant voltage stage in dependence upon control of said active components by the microcomputer.

2. A selector according to claim 1, wherein the constant voltage stage comprises:

a transistor;
   a diode coupled between said transistor and the switching-mode power components;
   a plurality of capacitors coupled between said diode and a reference potential;
   a resistor having a first lead coupled to a first node between said transistor and said diode, and a second lead coupled to a control electrode of said transistor; and
   a Zener diode having a first lead coupled to said control electrode and a second lead coupled to said reference potential.

3. A selector according to claim 1, wherein the main power control means, comprises:

a plurality of transistors;
   a first resistor coupled between a control electrode of a first one of said plurality of transistors and the microcomputer;
   a second resistor coupled between a principal conduction path electrode of said first one of said plurality of transistors and a control electrode of a second one of said plurality of transistors; and
   a third resistor coupled between said control electrode of said second one of said plurality of transistors and a reference potential.

4. A selector according to the claim 1, wherein the radio driving means comprises:

a transistor having a first conduction path electrode coupled to a reference potential;
   a switch with a first terminal coupled to receive said output from said main power control means;
   a bias resistor coupled between a second terminal of said switch and a control electrode of said transistor; and
   a relay having a coil coupled between a second principal conduction path electrode of said transistor and said output of said constant voltage stage.

5. The selector of claim 1, further comprised of said driving means interrupting application of said electrical power to the radio under control of the microcomputer.

6. A television/radio selector of a remote controller type using a common power supply including a main power circuit enabling power to be applied to a next stage, comprising:

means for supplying a regulated voltage signal at a first node in dependence upon a first power signal received from the main power circuit;

control means coupled to said first node, having a first output terminal for receiving a second power signal from the main power circuit, for responding to a first one of a plurality of logic states of a control signal by providing said second power signal to a video driver of a television, having a second output terminal, for responding to a second one of said plurality of said logic states by connecting said first output terminal to a reference potential and thereby interrupting provision of said second power signal to the video driver, and for exhibiting an intermediate potential at said second output terminal in dependence upon said logic states; and driving means coupled to said first node and second output terminal, for providing said first power signal to a third output terminal in dependence upon an amplitude of said intermediate potential occurring in response to said second one of said plurality of said logic states, said third output terminal being connected to provide said first power signal to a radio.

7. A selector according to claim 6, wherein the regulated voltage signal supplying means comprises:

a transistor;
   a diode connectable between said transistor and the main power circuit;
   a plurality of capacitors coupled between said diode and a reference potential;
   a resistor having a first lead coupled to said diode and a second lead coupled to a control electrode of said transistor; and
   a Zener diode connected between said control electrode and said reference potential.

8. A selector according to claim 6, wherein said control means comprises:

first and second transistors,
   a first resistor coupled to conduct said control signal to a control electrode of said first transistor,
   a second resistor coupled between a principal conduction path electrode of said first transistor and a control electrode of said second transistor, and
   a third resistor coupled between said control electrode of said second transistor and said reference potential.

9. A selector according to the claim 6, wherein the driving means comprises:

a transistor having a first principal conduction path electrode coupled to the reference potential;
   a switch with a first terminal;
   a bias resistor coupled between a second terminal of said switch and a control electrode of said transistor; and
   a relay having a coil coupled between a second principal conduction path electrode of said transistor and said first node.

10. A selector according to claim 6, wherein said control means comprises:
- a first plurality of transistors;
- a first resistor coupled to conduct said control signal to a control electrode of a first one of said first plurality of transistors;
- a second resistor coupled between a principal conduction path electrode of said first one of said first plurality of transistors and a control electrode of a second one of said first plurality of transistors; and
- a third resistor coupled between said control electrode of said second one of said first plurality of transistors and said reference potential; and wherein said driving means comprises:
- a second transistor having a first principal conduction path electrode coupled to the reference potential;
- a switch with a first terminal;
- a bias resistor coupled between a second terminal of said switch and a control electrode of said second transistor, and
- a relay having a coil coupled between a second principal conduction path electrode of said transistor and said first node.

11. A selector according to claim 10, wherein the regulated voltage signal supplying means comprises:
- a third transistor,
- a second diode connected between said third transistor and the main power circuit,
- a plurality of capacitors coupled between said said second diode and said reference potential,
- a fourth resistor having a first lead coupled to said second diode and a second lead coupled to a control electrode of said third transistor, and
- a Zener diode connected between said control electrode of said third transistor and said reference potential.

12. The selector of claim 6, further comprised of said driving means interrupting said application of said first power signal to said third output terminal during said first one of said plurality of logic states.

13. The selector of claim 6, further comprised of:
- said control means varying amplitude of said intermediate potential in dependence upon said plurality of logic states; and
- said driving means interrupting said application of said first power signal to said third output terminal in dependence upon said amplitude of said intermediate potential.

14. A process for selecting one of a plurality of appliances using a common power supply including a main power circuit, comprising:
- supplying a regulated voltage signal at a first node in dependence upon a first power signal received from the main power circuit;
- responding to a first one of a plurality of logic states of a control signal by providing a second power signal to a first one of the appliances;
- responding to a second one of said plurality of said logic states by connecting a first output terminal to a reference potential and thereby interrupting said providing of said second power signal to said first one of said appliances;
- providing an intermediate potential at a second output terminal in dependence upon said logic states; and
- applying said regulated voltage signal to enable application of said first power signal to a third output terminal in dependence upon an amplitude of said intermediate potential occurring in response to said second one of said plurality of said logic states, said third output terminal being connectable to provide said first power signal to a second one of said appliances.

15. The process of claim 14, further comprised of interrupting said application of said first power signal to said third output terminal during occurrence of said first one of said plurality of logic states.

16. The process of claim 14, further comprised of changing said amplitude of said intermediate potential during occurrence of said second one of said plurality of logic states to enable interruption of said application of said first power signal to said third output terminal.

17. A television and radio selector, comprising:
- main power circuit including a standby power supply terminal for providing a standby power voltage and a main power supply terminal for providing a main power voltage;
- constant voltage means, coupled to said standby power supply terminal, for generating a regulated voltage from said standby power voltage;
- control means for receiving said regulated voltage, and for generating control signals in response to received commands;
- radio driver means for providing a supply voltage to a radio part; and
- main power control means, for alternatively enabling application of said main power voltage to driver components of a television and enabling said radio driver means to provide said supply voltage to said radio part in response to said control signals.

18. A television and radio selector according to claim 17, wherein said main power circuit comprises:
- rectifier means for generating a direct current power supply from an alternating current power supply;
- transformer means for generating said standby power voltage from said direct current power supply; and
- smoothing means for generating said main power voltage from said direct current power supply.

19. A television and radio selector according to claim 17, wherein said constant voltage means comprises:
- at least one capacitor for smoothing voltages;
- a transistor having a first terminal of a principal conduction path connected to a power terminal of said microcomputer;
- a Zener diode connected between a ground terminal and a control terminal of said transistor; and
- a resistor connected between said control terminal of said transistor and a second terminal of said principal conduction path of said transistor.

20. A television and radio selector according to claim 17, wherein said radio driver means comprises:
- a relay having a relay coil, for selectively providing said supply voltage to said radio part; and
- a transistor, series connected to said relay coil between a ground terminal and a regulated voltage terminal, for receiving an enable signal from said main power control means at a control terminal.

21. A television and radio selector according to claim 17, wherein said main power control means comprises:
- a first transistor having a first terminal of a principal conduction path connected to a regulated voltage terminal for providing said regulated voltage, a control terminal receiving said control signals, and a second terminal of said principal conduction path connected to said radio driver means;

a second transistor having a control terminal connected to said first transistor through a resistor and principal conduction path connected between a reference voltage terminal, said main power supply terminal, and a power input terminal of said driver components.

22. A television and radio selector according to claim 17, wherein said supply voltage is said standby power voltage.

23. A television and radio selector according to claim 17, further comprising remote controller means for issuing said commands received by said control means in response to user control.

* * * * *

UNITED STATES PATENT AND TRADEMARK OFFICE
CERTIFICATE OF CORRECTION

PATENT NO. : 5,283,654
DATED : Feb. 1, 1994
INVENTOR(S) : Byung-Seong Cho

It is certified that error appears in the above-indentified patent and that said Letters Patent is hereby corrected as shown below:

IN THE TITLE

Item
[54],     Title      change "TV-RADIO" to --TV/RADIO--, after "RADIO", insert --SELECTOR--, and after "A", change "SAME" to --COMMON--.

Column 1,     Line 2,      change "TV-RADIO" to --TV/RADIO--, after "RADIO", insert --SELECTOR--, and after "A", change "SAME" to --COMMON--;

Line 17,      after "because", delete ",";

Line 52,      before "DESCRIPTION", change "BRIEF"

to --DETAILED--;

UNITED STATES PATENT AND TRADEMARK OFFICE
CERTIFICATE OF CORRECTION

PATENT NO. : 5,283,654
DATED : Feb. 1, 1994
INVENTOR(S) : Byung-Seong Cho

It is certified that error appears in the above-indentified patent and that said Letters Patent is hereby corrected as shown below:

Column 1,    Line 54,    after "invention", insert --.--;

Line 56,    before "DESCRIPTION", change "DETAILED" to --BRIEF--; and

Column 2,    Line 20,    before "dc", insert --to--:

Signed and Sealed this

Twentieth Day of May, 1997

Attest:

BRUCE LEHMAN

*Attesting Officer*    *Commissioner of Patents and Trademarks*